(12) United States Patent
Horii et al.

(10) Patent No.: US 8,354,810 B2
(45) Date of Patent: Jan. 15, 2013

(54) ELECTRIC POWER STEERING DEVICE

(75) Inventors: Hiroaki Horii, Saitama (JP); Yoshinobu Mukai, Saitama (JP); Kyoji Hamamoto, Saitama (JP); Hiroki Sagami, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 183 days.

(21) Appl. No.: 12/921,676

(22) PCT Filed: Mar. 4, 2009

(86) PCT No.: PCT/JP2009/054043
§ 371 (c)(1),
(2), (4) Date: Sep. 9, 2010

(87) PCT Pub. No.: WO2009/113431
PCT Pub. Date: Sep. 17, 2009

(65) Prior Publication Data
US 2011/0000738 A1    Jan. 6, 2011

(30) Foreign Application Priority Data

Mar. 10, 2008  (JP) ................. 2008-059322

(51) Int. Cl.
*H02P 27/04* (2006.01)
*B62D 5/04* (2006.01)
*B62D 6/00* (2006.01)
(52) U.S. Cl. ............ 318/400.23; 318/799; 318/805; 180/443; 180/6.2

(58) Field of Classification Search ............ 318/400.23; 701/41, 42, 44; 180/400, 443, 444, 427, 180/446; 74/388 PS, 422
See application file for complete search history.

(56) References Cited

U.S. PATENT DOCUMENTS

| 6,498,449 | B1 | 12/2002 | Chen et al. | |
| 6,639,379 | B2 * | 10/2003 | Matsushita et al. | 318/727 |
| 7,349,781 | B2 * | 3/2008 | Tamaizumi | 701/42 |
| 7,604,088 | B2 * | 10/2009 | Nishizaki et al. | 180/446 |

(Continued)

FOREIGN PATENT DOCUMENTS

EP    1 334 899 A2    8/2003

(Continued)

OTHER PUBLICATIONS

"Theory of AC servo system and designing thereof in practice, chapter three, power converter circuit", Jul. 10, 2005, pp. 44 to 45, 7$^{th}$ edition, Sougou Denshi Shuppan.

*Primary Examiner* — Eduardo Colon
(74) *Attorney, Agent, or Firm* — Arent Fox LLP

(57) ABSTRACT

An electric motor is driven with high output at the time of low-speed running, and a steering at a high resolution is enabled at the time of fast-speed running. An electric power steering device causes the electric motor to generate auxiliary torque in accordance with the largeness of steering wheel torque by the steering operation of a wheel made by a driver and reduces the steering wheel torque to the driver. A control device drives, based on a vehicle-speed signal (Vs) from a speed sensor, the electric motor with high output at the time of low-speed running, and enables steering at a high resolution at the time of fast-speed running without increasing an electric-motor output.

9 Claims, 6 Drawing Sheets

U.S. PATENT DOCUMENTS

| | | | |
|---|---|---|---|
| 7,711,463 B2 * | 5/2010 | Oya et al. | 701/41 |
| 7,860,624 B2 * | 12/2010 | Kubota et al. | 701/41 |
| 7,891,460 B2 * | 2/2011 | Kim | 180/443 |
| 7,954,395 B2 * | 6/2011 | Ishii | 74/388 PS |
| 2004/0217729 A1 | 11/2004 | Recker | |
| 2007/0107973 A1 * | 5/2007 | Jiang et al. | 180/443 |
| 2007/0205041 A1 * | 9/2007 | Nishizaki et al. | 180/446 |
| 2009/0322268 A1 * | 12/2009 | Imamura et al. | 318/400.23 |
| 2011/0231066 A1 * | 9/2011 | Ohno et al. | 701/42 |

FOREIGN PATENT DOCUMENTS

| | | |
|---|---|---|
| EP | 1 691 475 A2 | 8/2006 |
| JP | 11-321691 A | 11/1999 |
| JP | 2006-020381 A | 1/2006 |
| JP | 2006-081230 A | 3/2006 |
| JP | 2007-116862 A | 5/2007 |
| WO | WO 2006/057317 A1 | 6/2006 |
| WO | WO 2007/072025 A2 | 6/2007 |

* cited by examiner

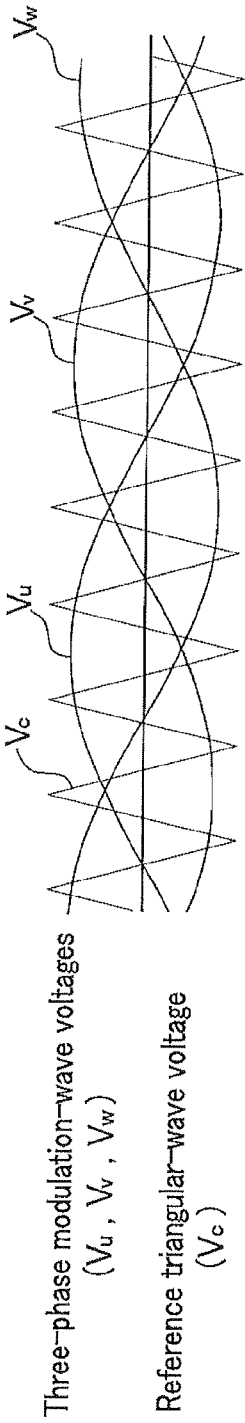
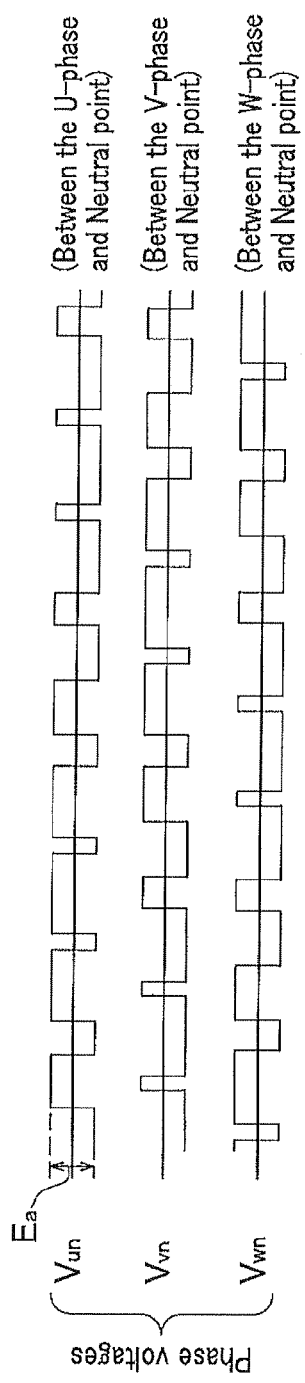
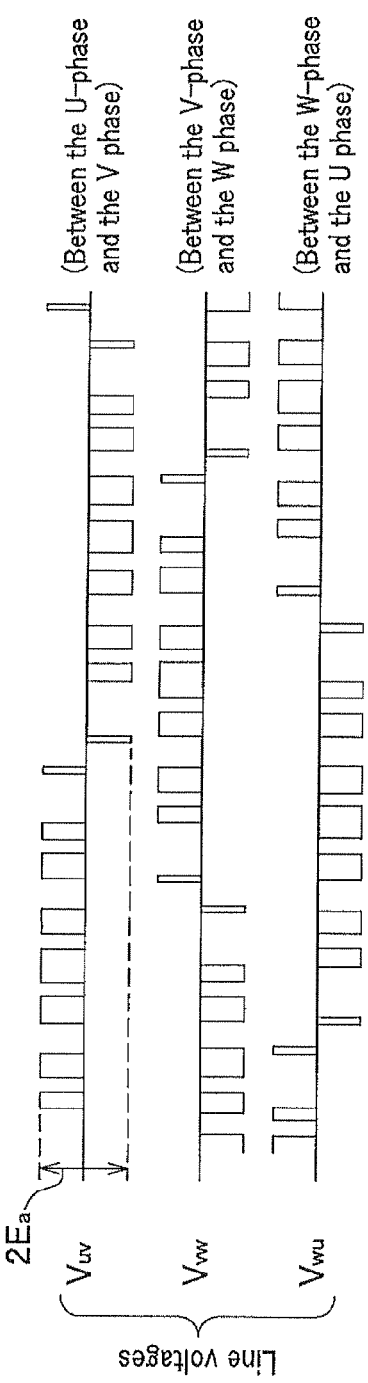
FIG.5A
FIG.5B
FIG.5C

ELECTRIC POWER STEERING DEVICE

BACKGROUND OF THE INVENTION

1. Field of the Invention

The present invention relates to an electric power steering device which assists steering wheel torque with a multiphase AC motor.

2. Description of the Related Arts

An electric power steering device causes an electric motor to generate auxiliary torque in accordance with steering wheel torque by a steering operation by a driver and reduces the steering wheel torque.

It is requisite for the electric power steering device to perform a control to the electric motor which does not affect the steering feeling to the driver.

PWM control by a triangular-wave comparison technique is for comparing a three-phase sine-wave command voltage with a reference triangular-wave voltage and for generating a PWM-control signal voltage. A PWM inverter generates, based on the PWM-control signal voltage, a rectangular-wave drive voltage having undergone the PWM control, applies the rectangular-wave drive voltage to the electric motor, and allows a three-phase current to flow.

Moreover, when a PWM control is performed using a PWM-control signal voltage generated with the amplitude ratio of the three-phase sine-wave command voltage being increased, the amplitude ratio is limited to a predetermined amplitude ratio because the average voltage of a PWM drive voltage fluctuates and the torque ripple of the electric motor increases. The amplitude ratio is, however, the ratio of the amplitude of a signal voltage relative to the amplitude of the reference triangular-wave voltage.

Non-patent document 1 discloses a technology of increasing the rate of utilization of voltage. According to such technology, a three-phase modulation-wave voltage that is a three-phase sine-wave command voltage modulated by a third-order integral-multiple harmonic (a triangular wave) is used for the PWM control.

The three-phase modulation-wave voltage becomes small in the vicinity of the amplitude of the signal voltage in comparison with the three-phase sine-wave command voltage. As a result, the average voltage of the PWM drive voltage does not fluctuate, and a range where the amplitude ratio can be set large expands, thereby improving the rate of utilization of voltage.

Non-Patent document 1: Theory of AC servo system and designing thereof in practice, chapter three, power converter circuit pages 44 to 45 (Jul. 10, 2005, seventh edition, published by: SOUGOU DENSHI SHUPPAN)

The technology disclosed in Non-patent document 1 improves the rate of utilization of voltage and increases a current flowing through the electric motor (multiphase AC motor), so that the electric motor can be driven with high output.

An electric power steering device to which the technology disclosed in Non-patent document 1 is applied does not affect the steering feeling to a driver even if the resolution of steering becomes small at the time of low-speed running (at the time of static steering).

However, as it is requisite to perform steering at a high resolution at the time of fast-speed running, the electric power steering device to which the technology disclosed in Non-patent document 1 is applied affects the steering feeling to the driver at the time of fast-speed running.

SUMMARY OF THE INVENTION

The present invention has been made in view of the foregoing problem, and it is an object of the present invention to provide an electric power steering device which can drive a multiphase AC motor with high output in accordance with a vehicle speed to reduce steering wheel torque, or which enables steering of a wheel at a high resolution without reducing the steering wheel torque.

In order to overcome the foregoing problem, an electric power steering device of the present invention according to claim 1 causes a vehicle to be steered by torque generated by a multiphase AC motor driven in accordance with a steering input, and comprises a control device which adds a fundamental of a drive voltage applied to the multiphase AC motor to a harmonic component of the fundamental and which drives the multiphase AC motor based on a modulation wave acquired by addition, wherein the control device causes the harmonic component to be variable in accordance with a vehicle speed.

According to such configuration, the modulation wave (e.g., a three-phase modulation-wave voltage) which is attenuated in the vicinity of the maximum amplitude and planarized by adding the fundamental (e.g., a three-phase sine-wave command voltage) to the harmonic component is applied to the multiphase AC motor, thereby making an electric motor output increased.

In this case, as the harmonic component is caused to be variable in accordance with the vehicle speed and an output by the multiphase AC motor is also caused to be variable, the electric motor output can be increased at the time of low-speed running and a steering at a high resolution is enabled at the time of fast-speed running.

Moreover, in the foregoing electric power steering device, the control device comprises: sine-wave generating means for generating a sine wave dependent on a rotation angle of the multiphase AC motor; a harmonic generator which generates a harmonic component with the sine wave being as the fundamental; a variable controller which changes an amplitude of the harmonic component in accordance with the vehicle speed; a multiphase adder which adds the sine wave to the harmonic component to generate the modulation wave; and a PWM inverter which performs PWM control on the multiphase AC motor using the modulation wave.

According to the foregoing configuration, the multiphase AC motor is driven by a PWM control with a small torque ripple by using a three-phase modulation wave acquired by adding a three-phase sine wave to a harmonic component having an amplitude which changes in accordance with the vehicle speed.

Accordingly, at the time of low-speed running which requires large steering wheel torque, the rate of utilization of voltage can be increased and a voltage applicable to the multiphase AC motor can be also increased, so that an electric motor output can be made increased. Moreover, at the time of fast-speed running which requires a steering at a high resolution, the steering is enabled at a high resolution without making the electric motor output increased. Consequently, this does not affect the steering feeling to a driver.

Moreover, in a preferred embodiment, according to the electric power steering device of the present invention as set forth in claim 3, the variable controller is a switch which outputs a value acquired by setting the amplitude of the harmonic component to zero when the vehicle speed exceeds a predetermined value (e.g., a speed threshold Vs1 [km/h]) and directly outputs a value of the harmonic component when the vehicle speed is equal to the predetermined value or slower.

Furthermore, in a preferred embodiment, according to the electric power steering device of the present invention as set forth in claim 4, the harmonic component is a triangular wave which is a harmonic odd-number multiple of the fundamental.

The triangular wave is the odd-number multiple harmonic, and can be easily generated. This facilitates the designing of a harmonic generator and the manufacturing thereof.

Moreover, the harmonic component includes a third-order integral-multiple harmonic relative to the fundamental.

In this case, the average voltage of a voltage (a line voltage) applied to the multiphase AC motor contains no third-order integral-multiple harmonic component, so that a waveform does not become fluctuated.

According to the present invention, it becomes possible to drive a multiphase AC motor with high output in accordance with a vehicle speed to reduce steering wheel torque, or to enable steering of a wheel at a high resolution without reducing the steering wheel torque.

BRIEF DESCRIPTION OF THE DRAWINGS

FIG. 5(a) is a diagram showing an a Pulse Width Modulation (PWM) conversion performed by a PWM inverter in FIG. 2;

FIG. 5(b) is a diagram showing a phase voltage of a PWM drive voltage applied to an electric motor in FIG. 2;

FIG. 5(c) is a diagram showing a line voltage of a PWM drive voltage applied to an electric motor in FIG. 2.

DESCRIPTION OF REFERENCE NUMERALS

| | |
|---|---|
| 1 | Electric power steering device |
| 2 | Steering wheel |
| 3 | Steering shaft |
| 4 | Pinion shaft |
| 4A | Pinion |
| 5 | Torque sensor |
| 6 | Torque transmitting means |
| 7 | Electric motor (multiphase AC motor) |
| 8 | Rack shaft |
| 8A | Rack tooth |
| 9 | Wheel |
| 10 | Control device |
| 11 | Speed sensor |
| 15 | High-voltage battery |
| 20 | PWM inverter |
| 21 | Angle sensor |
| 22 | Main body |
| 25 | Current sensor |
| 30 | Biaxial/three-phase coordinate converter (sine-wave generating means) |
| 31 | Harmonic generator |
| 32 | Three-phase adder (multiphase adder) |
| 33 | Switch (variable controller) |
| 35 | Three-phase/biaxial coordinate converter |
| 50 | Target-current converter |

PREFERRED EMBODIMENT OF THE INVENTION

First Embodiment

Figure 1:
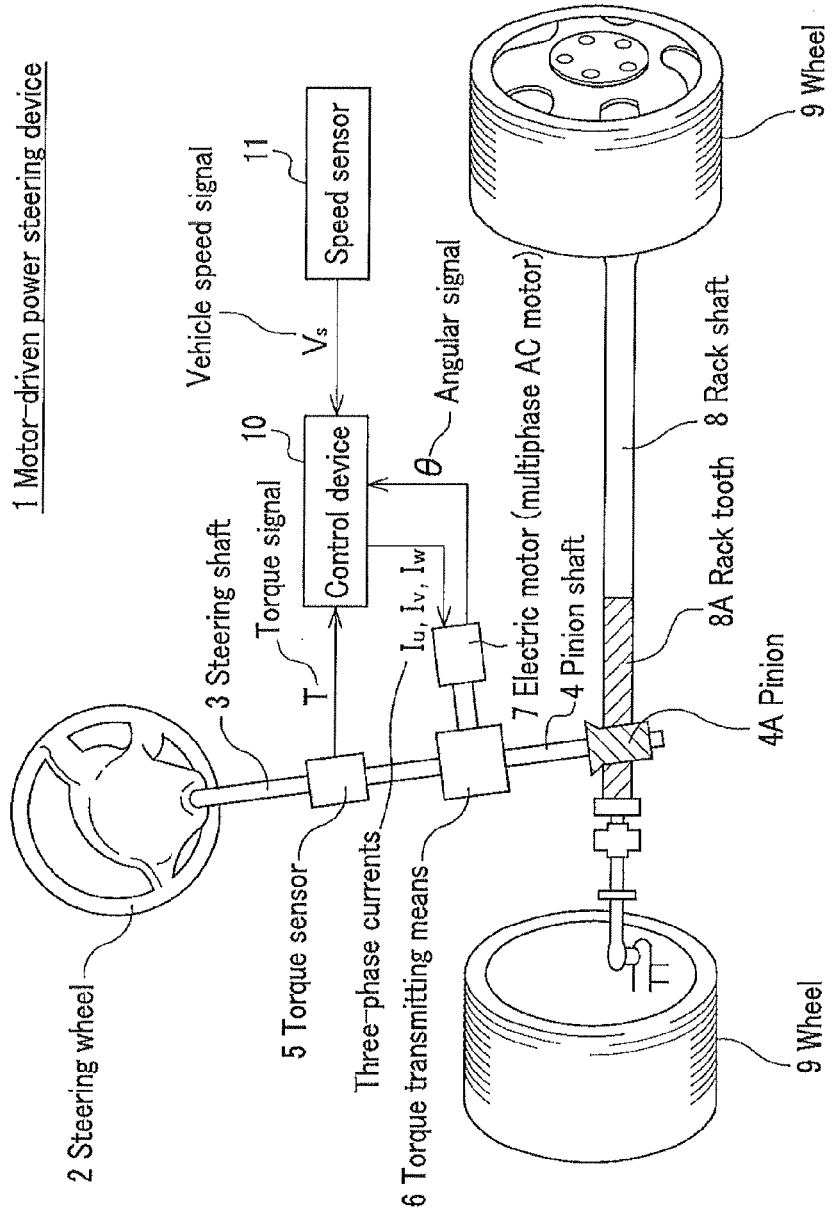
FIG. 1 is a diagram showing an electric power steering device according to an embodiment of the present invention.

FIG. 1 is a diagram showing an electric power steering device 1 according to an embodiment of the present invention. The electric power steering device 1 comprises a steering wheel 2, a steering shaft 3, a pinion shaft 4, a pinion 4A, a torque sensor 5, torque transmitting means 6, an electric motor 7, a rack shaft 8, a rack tooth 8A, two wheels 9, a control device 10, and a speed sensor 11. An example of the electric motor 7 which is a multiphase AC motor is a three-phase brushless motor.

A driver steers the running direction of a vehicle through the electric power steering device 1 by manipulating the steering wheel 2.

The steering wheel 2 transmits rotary force based on steering wheel torque from the driver to the torque sensor 5, to the torque transmitting means 6, and to the pinion 4A through the steering shaft 3 and the pinion shaft 4.

The pinion 4A and the rack tooth 8A mesh together to convert the rotary force into force for a linear motion in the axial direction of the rack shaft 8. The force from the rack shaft 8 for a linear motion acts on the two wheels 9, 9 which change a direction by what corresponds to a steering angle in accordance with the rotary force. As a result, the running direction of the vehicle changes in accordance with the manipulation given by the driver.

The torque sensor 5 detects steering wheel torque applied to the steering shaft 3 in accordance with a steering operation by the driver through the steering wheel 2, generates an electrical torque signal T, and outputs the torque signal T to the control device 10. The speed sensor 11 detects the velocity of the vehicle (a vehicle speed) and outputs a vehicle-speed signal Vs to the control device 10.

The electric motor 7 generates auxiliary torque based on three-phase currents Iu, Iv, and Iw, and transmits the generated auxiliary torque to the pinion 4A and to the rack shaft 8 through the torque transmitting means 6. As a result, the steering wheel torque of the driver is reduced. The control device 10 generates a PWM drive voltage which is a rectangular-wave voltage based on the torque signal T, on the vehicle-speed signal Vs, and on an angular signal θ, applies the generated PWM drive voltage to the electric motor 7, and allows the three-phase currents Iu, Iv, and Iw to flow.

Moreover, the electric motor 7 outputs the angular signal θ which represents the rotation angle of the electric motor 7 to the control device 10.

Figure 2:
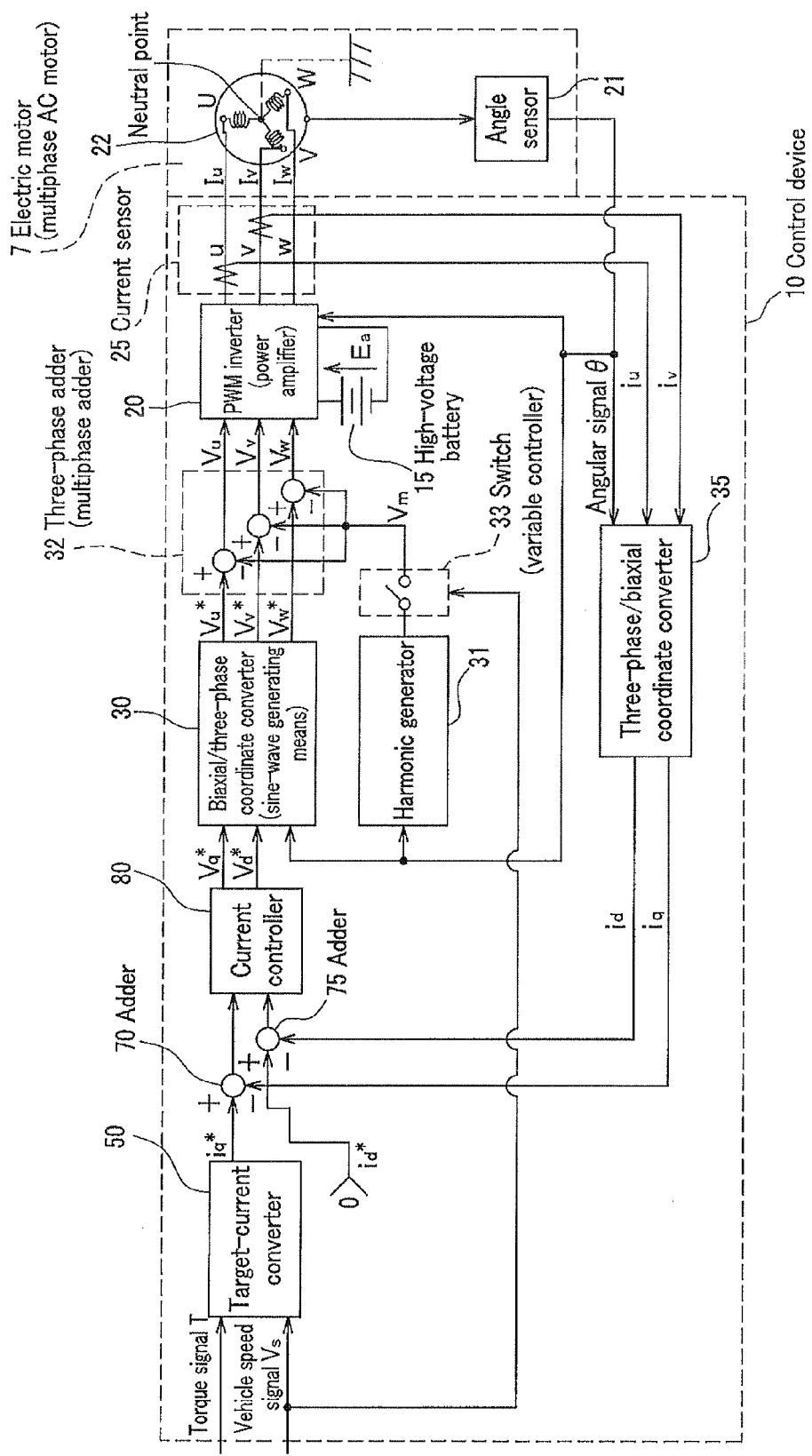
FIG. 2 is a block diagram showing a control device and an electric motor both in FIG. 1.

FIG. 2 is a block diagram showing the control device 10 and the electric motor 7 both in FIG. 1. The control device 10 has a target-current converter 50, adders 70, 75, a current controller 80, a biaxial/three-phase coordinate converter 30, a three-phase adder 32, a harmonic generator 31, a switch 33 (a variable controller), and a three-phase/biaxial coordinate converter 35, and respective functions of those units are realized by a computer having a CPU, a ROM and a RAM, and by a program.

Furthermore, the control device 10 has a PWM inverter 20, a high-voltage battery 15, and a current sensor 25.

The electric motor 7 has a main body 22 and an angle sensor 21, and the main body 22 has a stator and a rotator, and the stator has at least three stator coils. The three stator coils each has one end connected to a neutral point and the other end connected to the terminal of the main body 22, and are connected in a star connection manner. The rotator of the main body 22 has a rotary shaft which is rotatably supported, and rotary force is applied thereto by a magnetic field generated by the three stator coils.

The control device 10 performs dq vector control which decomposes a current into a magnetic-pole axis component and into a torque axis component, and also performs feedback control so as to cause a deviation between a q-axis current command value iq* and a q-axis electric-motor current value iq to be zero. A d-axis component is the magnetic-pole axis component, and a q-axis component is the torque axis component. The current sensor 25 detects respective current values of the two phase currents Iu, and Iv among the three-phase currents of the electric motor 7, and transmits a U-phase electric-motor current value in and a V-phase electric-motor current value iv to the three-phase/biaxial coordinate converter 35. The angle sensor 21 detects the rotation angle of the rotary shaft of the electric motor 7 and outputs the angular signal θ to the biaxial/three-phase coordinate converter 30, to the harmonic generator 31, to the PWM inverter 20, and to the three-phase/biaxial coordinate converter 35.

The three-phase/biaxial coordinate converter 35 performs three-phase/biaxial coordinate conversion based on the U-phase electric-motor current value iu, on the V-phase electric-motor current value iv, and on the angular signal θ, and generates a d-axis electric-motor current value id and the q-axis electric-motor current value iq. Moreover, a W-phase electric-motor current value iv is acquired through a calculation based on an equation: iu+iv+iw=0. The calculation of the three-phase/biaxial coordinate conversion is performed by using, for example, a following equation.

$$\begin{bmatrix} Id \\ Iq \end{bmatrix} = \sqrt{2} \begin{bmatrix} \sin(\theta + \pi/3) & \sin\theta \\ \cos(\theta + \pi/3) & \cos\theta \end{bmatrix} \begin{bmatrix} Iu \\ Iv \end{bmatrix} \quad \text{[Equation 1]}$$

where θ in the equation is an electric angle, and is a value acquired by multiplying the mechanical rotation angle (mechanical angle) of the rotator by the number of polar pairs.

The three-phase/biaxial coordinate converter 35 outputs the d-axis electric-motor current value id to the adder 75, and outputs the q-axis electric-motor current value iq to the adder 70.

The target-current converter 50 generates, based on the torque signal T and on the vehicle-speed signal Vs, the corresponding q-axis current command value iq* and outputs the generated value to the adder 70. Note that when a weakened field control is not performed, a d-axis current command value id* is set to zero.

The adder 70 subtracts the q-axis electric motor-current value id from the q-axis current command value iq* and outputs the subtraction result to the current controller 80. The adder 75 subtracts the d-axis electric-motor current value id from the q-axis current command value id* and outputs the subtraction result to the current controller 80.

The current controller 80 performs proportional/integral control (PT control) on respective output signals by the adders 70, 75, generates corresponding q-axis voltage command value Vq* and d-axis voltage command value Vd*, and outputs those generated values to the biaxial/three-phase coordinate converter 30.

The biaxial/three-phase coordinate converter 30 is sine-wave generating means which generates a sine wave dependent on the rotation angle of the electric motor 7, performs biaxial/three-phase coordinate conversion based on the q-axis voltage command value Vq*, on the d-axis voltage command value Vd*, and on the angular signal θ, and generates three-phase sine-wave command voltages Vu*, Vv*, and Vw*. The calculation of the biaxial/three-phase coordinate conversion is performed by using, for example, a following equation.

$$\begin{bmatrix} Vu^* \\ Vv^* \\ Vw^* \end{bmatrix} = \sqrt{2/3} \begin{bmatrix} \cos\theta & -\sin\theta \\ \cos(\theta - 2/3\pi) & -\sin(\theta - 2/3\pi) \\ \cos(\theta + 2/3\pi) & -\sin(\theta + 2/3\pi) \end{bmatrix} \begin{bmatrix} Vd^* \\ Vq^* \end{bmatrix} \quad \text{[Equation 2]}$$

The biaxial/three-phase coordinate converter 30 outputs the three-phase sine-wave command voltages Vu*, Vv*, and Vw* to the three-phase adder 32. The three-phase sine-wave command voltages Vu*, Vv*, and Vw* are three sine-wave signal voltages each having a phase difference of 120 degree one another, and having the same frequency and amplitude.

The harmonic generator 31 generates, based on the angular signal θ, a synchronous triangular-wave voltage Vm which is a harmonic component of the three-phase sine-wave command voltages Vu*, Vv*, and Vw*, and outputs the generated voltage to the switch 33. The synchronous triangular-wave voltage Vm is, for example, a triangular wave, and is a signal voltage generated as the synchronized odd-number multiple of harmonic component is overlapped relative to the three-phase sine-wave command voltages Vu*, Vv*, and Vw*.

Figure 3:
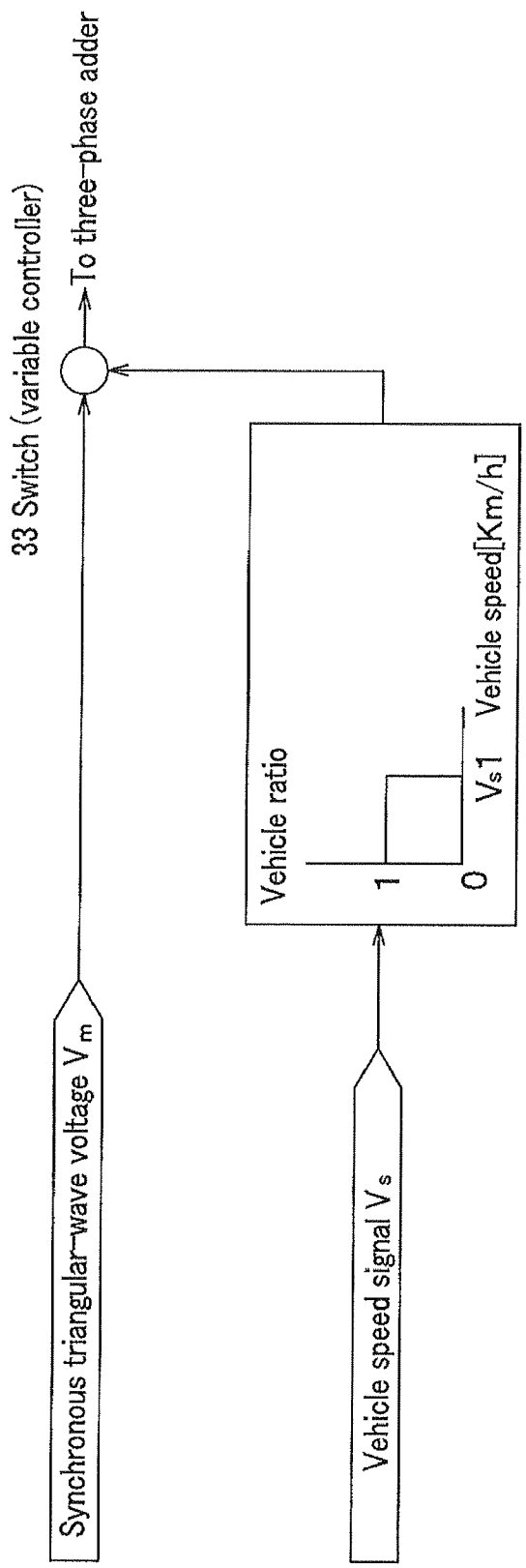
FIG. 3 is a diagram showing an operation of a switch in FIG. 2.

FIG. 3 is a diagram showing an operation of the switch 33 in FIG. 2. The switch 33 is a variable controller, does not change the amplitude of the synchronous triangular-wave voltage Vm when the vehicle-speed signal Vs is equal to a speed threshold Vs1 [km/h] or slower, and sets the amplitude value of the synchronous triangular-wave voltage Vm to zero when the vehicle-speed signal Vs exceeds the speed threshold Vs1. The switch 33 outputs the synchronous triangular-wave voltage Vm to the three-phase adder 32.

Note that a value indicating a boundary between when the vehicle runs at a slow speed and when the vehicle runs at a fast speed is set as the speed threshold Vs1.

Figure 4:
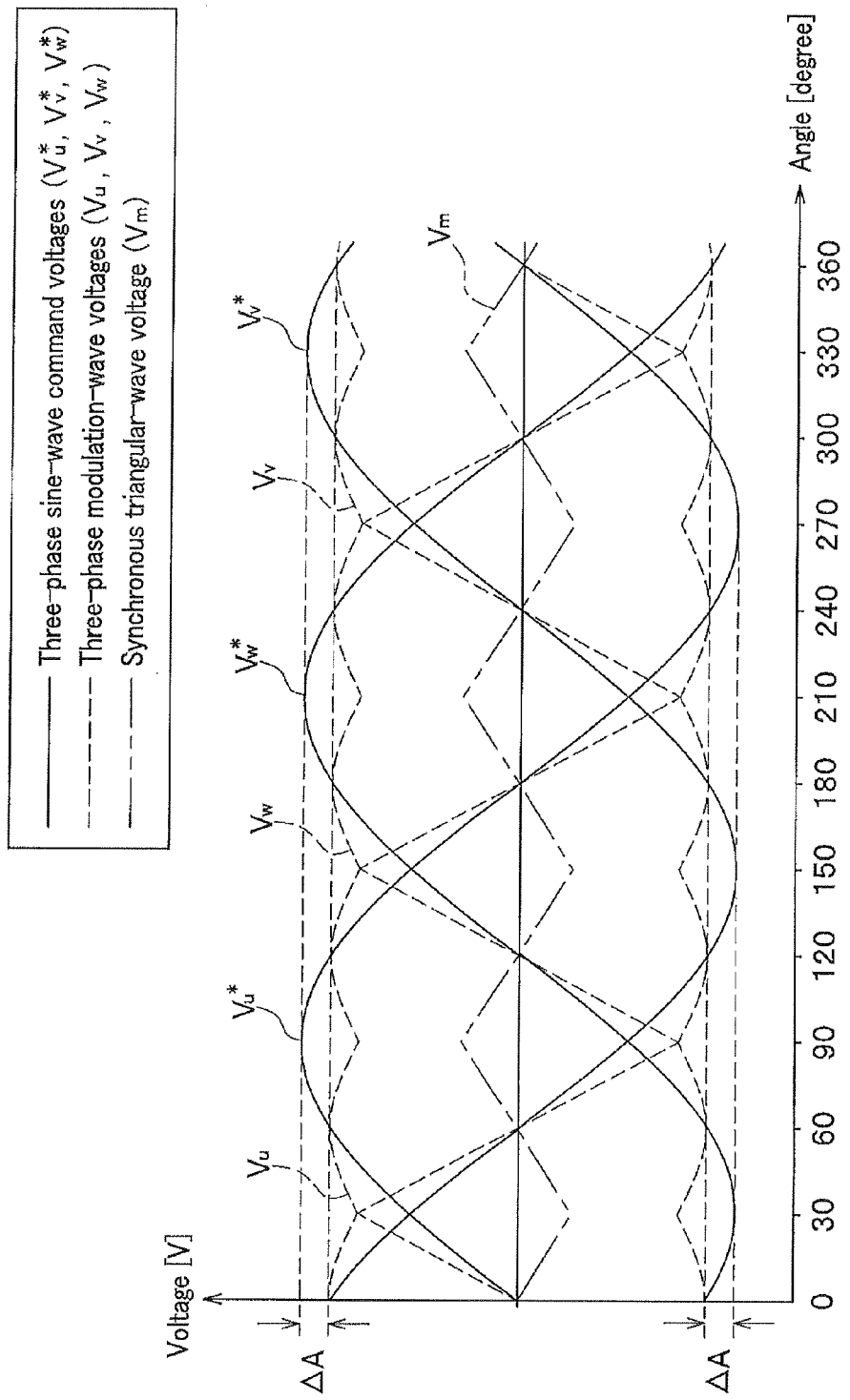
FIG. 4 is a diagram showing a signal voltage which is input/output by a three-phase adder in FIG. 2.

FIG. 4 is a diagram showing a signal voltage which is input/output by the three-phase adder 32 in FIG. 2. The vertical axis represents a voltage [V], and the horizontal axis represents an angle [degree]. The three-phase adder 32 (a multiphase adder) subtracts the amplitude value of the synchronous triangular-wave voltage Vm from each amplitude value of the three-phase sine-wave command voltage Vu*, Vv*, and Vw*, generates three-phase modulation-wave voltages Vu, Vv, and Vw, respectively, and outputs those generated voltages to the PWM inverter 20 (see FIG. 2).

Moreover, this figure shows a case in which the switch 33 (see FIG. 2) does not change the amplitude of the synchronous triangular-wave voltage Vm. The three-phase modulation-wave voltages Vu, Vv, and Vw attenuate in the vicinity of respective maximum amplitudes in comparison with the three-phase sine-wave command voltages Vu*, Vv*, and Vw*. Accordingly, the amplitudes become small by 2Δ A as a whole.

Note that when the switch 33 sets the amplitude of the synchronous triangular-wave voltage Vm to zero, respective waveforms of the three-phase modulation-wave voltages Vu, Vv, and Vw become the same sine waveforms as waveforms of the three-phase sine-wave command voltages Vu*, Vv*, and Vw*, respectively. Moreover, the three-phase adder 32 may be configured so as to multiply by a predetermined gain in accordance with a vehicle speed instead of the switch.

FIG. 5 is a diagram showing an operation performed by the PWM inverter 20 in FIG. 2. To facilitate explanation, the respective waveforms of the three-phase modulation-wave voltages Vu, Vv, and Vw are waveforms in a case in which the switch 33 sets the amplitude of the synchronous triangular-wave voltage Vm to zero (the vehicle-speed signal Vs exceeds the speed threshold Vs1 [km/h]).

FIG. 5(a) is a diagram showing a PWM conversion performed by the PWM inverter 20. The PWM inverter 20 compares a reference triangular-wave voltage Vc generated by a non-illustrated triangular-wave generator with each of the three-phase modulation-wave voltages Vu, Vv, and Vw, performs PWM conversion by a triangular-wave comparison technique, and generates a PWM-control signal voltage. The reference triangular-wave voltage Vc has a frequency set to be higher than those of the three-phase modulation-wave voltages Vu, Vv, and Vw. As the frequency of the reference triangular-wave voltage Vc is set to be high, a torque ripple generated by the electric motor 7 becomes small.

As shown in FIG. 2, the high-voltage battery 15 supplies a DC voltage Ea to the PWM inverter 20. The PWM inverter 20 turns on/off non-illustrated plural switching elements at predetermined timings based on the PWM-control signal voltage.

FIG. 5(b) is a diagram showing a phase voltage of a PWM drive voltage applied to the electric motor 7 in FIG. 2. Phase voltages Vun, Vvn, and Vwn each has an amplitude that is the DC voltage Ea, and are respectively applied between the U-phase terminal of the main body 22 of the electric motor 7 and the neutral point, between the V-phase terminal of the main body 22 and the neutral point, and between the W-phase terminal of the main body 22 and the neutral point.

FIG. 5(c) is a diagram showing a line voltage of the PWM drive voltage applied to the electric motor 7 in FIG. 2. Line voltages Vuv, Vvw, and Vwu each has an amplitude twice as much as the DC voltage E2, and are respectively applied between the U-phase terminal of the main body 22 of the electric motor 7 and the V-phase terminal thereof, between the V-phase terminal of the main body 22 and the W-phase terminal thereof, and between the W-phase terminal of the main body 22 and the U-phase terminal thereof.

Figure 6:
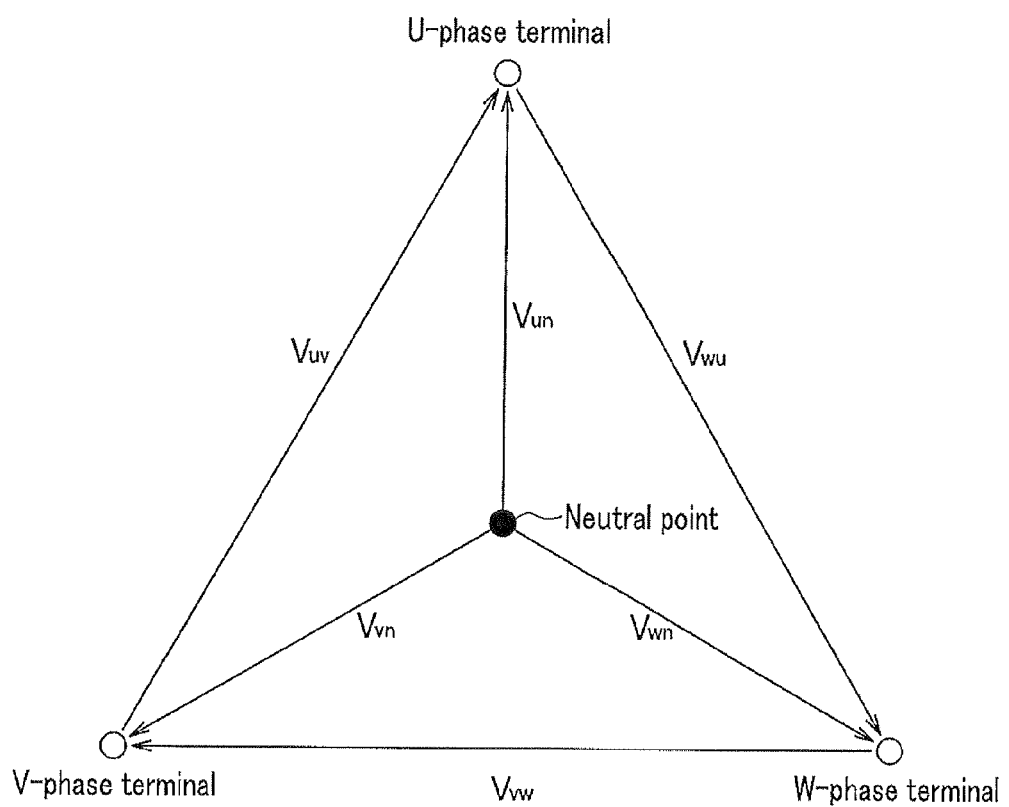
FIG. 6 is a diagram showing a relationship between a phase voltage of a PWM drive voltage and a line voltage thereof.

FIG. 6 is a diagram showing a relationship between a phase voltage of the PWM drive voltage and a line voltage thereof. The electric motor 7 generates auxiliary torque in accordance with steering wheel torque as the three-phase currents Iu, Iv, and Iw in accordance with the line voltages Vuv, Vvw, and Vwu flow through the electric motor 7.

In FIG. 5(c), each of the line voltages Vuv, Vvw, and Vwu which are applied to the electric motor 7 has a pulse width wide in the vicinity of a center part and has a pulse width narrow in the vicinity of both end parts in each time per a half period. Accordingly, an average voltage in one period becomes an equivalent sine-wave voltage.

In comparison with a case in which merely a voltage having a pulse width constant is applied to the electric motor 7, as the line voltages Vuv, Vvw, and Vwu having undergone the PWM control are applied, the average voltage of the PWM drive voltage does not fluctuate and the harmonic component is little, so that a torque ripple generated by the electric motor 7 becomes small.

Together with the increase of the torque signal T, respective amplitudes of the three-phase sine-wave command voltages Vu*, Vv*, and Vw* increase so that the electric motor 7 generates corresponding auxiliary torque. Likewise, respective amplitudes of the three-phase modulation-wave voltages Vu, Vv, and Vw increase.

However, when the respective amplitudes of the three-phase modulation-wave voltages Vu, Vv, and Vw exceed the amplitude of the reference triangular-wave voltage Vc, the average voltage of the PWM drive voltage (the line voltage) fluctuates and the harmonic component increases, causing the electric motor 7 to generate a torque ripple. Accordingly, respective maximum amplitude ratios of the three-phase modulation-wave voltages Vu, Vv, and Vw are limited to respective predetermined values (see, page 44 of Non-patent document 1).

When the switch 33 sets the amplitude of the synchronous triangular-wave voltage Vm to zero, although a maximum amplitude ratio that does not cause the average voltage of the PWM drive voltage (the line voltage) to fluctuate is set, the amplitude value of the fundamental component of the PWM drive voltage (the line voltage) becomes smaller than the DC voltage Ea. Accordingly, the rate of utilization of voltage is low. Here, the rate of utilization of voltage is the ratio of the amplitude value of the fundamental component of the PWM drive voltage (the line voltage) relative to the DC voltage Ea.

Conversely, when the switch 33 does not change the amplitude of the synchronous triangular-wave voltage Vm, a maximum amplitude ratio that does not cause the average voltage of the PWM drive voltage (the line voltage) to fluctuate is large in comparison with a case in which the amplitude of the synchronous triangular-wave voltage Vm is set to zero. That is, as shown in FIG. 4, the three-phase modulation-wave voltages Vu, Vv, and Vw can have respective amplitude values increased by voltage $2\Delta A$.

Accordingly, respective amplitudes of the fundamental components of the line voltages Vuv, Vvw, and Vwu based on the three-phase modulation-wave voltages Vu, Vv, and Vw each having the amplitude value increased by the voltage $2\Delta A$ can be also increased, so that the rate of utilization of voltage is also improved.

Moreover, when the amplitude of the synchronous triangular-wave voltage Vm is not changed, the maximum rate of utilization of voltage that does not cause the average voltage of the PWM drive voltage (the line voltage) to fluctuate increases in comparison with a case in which the amplitude of the synchronous triangular-wave voltage Vm is set to zero, and the amplitude value of the fundamental component of the PWM drive voltage (the line voltage) becomes substantially equal to the DC voltage Ea. Accordingly, as a maximum voltage value which can be applied to the electric motor 7 can be increased, respective maximum current values of the three-phase currents Iu, Iv, and Iw flowing in accordance with the maximum voltage value increase, thereby increasing maximum torque generated by the electric motor 7.

As a result, respective current values of the three-phase currents Iu, Iv, and Iw necessary for acquiring the same electric-motor output can be reduced. In this case, any loss inherent to resistive components like the stator coils is reduced, and the power efficiency is improved.

The control device 10 determines whether or not to set the amplitude value of the synchronous triangular-wave voltage Vm to zero in accordance with the vehicle-speed signal Vs.

The electric power steering device 1 generates large steering wheel torque at the time of low-speed running (at the time of static steering), and enables steering at a high resolution without increasing steering wheel torque at the time of fast-speed running. Moreover, large steering wheel torque is requisite at the time of low-speed running, and a steering at a high resolution is requisite at the time of fast-speed running. Accordingly, the torque ripple by the electric motor 7 is small, which does not affect the steering feeling to the driver.

Second Embodiment

In the control device 10 (see, FIG. 2), the switch 33 which selects whether or not to set the amplitude value of the synchronous triangular-wave voltage Vm to zero in accordance with the vehicle-speed signal Vs is exemplified as the "variable controller" of the first embodiment.

In a second embodiment, the control device 10 comprises a variable controller which causes the amplitude of a synchronous triangular-wave voltage Vm to be variable instead of the switch 33. In such case, the variable controller successively changes the amplitude of the synchronous triangular-wave voltage Vm in accordance with a vehicle-speed signal Vs.

Accordingly, it is also possible to increase the amplitude of the synchronous triangular-wave voltage Vm along with the increase of the vehicle-speed signal Vs, so that the steering feeling to a driver can be successively changed in accordance with the vehicle-speed signal Vs.

First Modified Embodiment

The harmonic generator 31 may also generate, based on the angular signal θ, the signal voltage of the synchronized third-order integral-multiple harmonic component with respect to the three-phase sine-wave command voltages Vu*, Vv*, and Vw*.

In this case, as the average voltage of the PWM drive voltage (the line voltage) applied to the electric motor 7 contains no third-order integral-multiple harmonic component, the waveform does not become fluctuated.

Second Modified Embodiment

Moreover, the control device 10 may also have a power amplifier instead of the PWM inverter 20. In such case, the power amplifier performs power amplification on the three-phase modulation-wave voltages Vu, Vv, and Vw and applies such amplified voltages to the electric motor 7. The electric motor 7 generates auxiliary torque based on the amplified three-phase modulation-wave voltages Vu, Vv, and Vw. Accordingly, it is possible to change an electric-motor output in accordance with the vehicle-speed signal Vs.

Third Modified Embodiment

Furthermore, the electric power steering device 1 of the present invention may include a steer-by-wire (Steer_By_Wire) that mechanically separates the steering wheel 2 and the wheel 9 from each other.

What is claimed is:

1. An electric power steering device (1) which causes a vehicle to be steered by torque generated by a multiphase AC motor (7) driven in accordance with a steering input, the electric power steering device (1) comprising:
a control device (10) which subtracts a harmonic component of a fundamental drive voltage applied to the multiphase AC motor (7) from the fundamental to generate a modulation wave, and which drives the multiphase AC motor (7) based on the modulation wave,
wherein the control device (10) causes the harmonic component to be variable in accordance with a vehicle speed.

2. The electric power steering device (1) according to claim 1, wherein the control device (10) comprises:
sine-wave generating means (30) for generating a sine wave dependent on a rotation angle of the multiphase AC motor (7);
a harmonic generator (31) which generates a harmonic component with the sine wave being as the fundamental;
a variable controller (33) which changes an amplitude of the harmonic component in accordance with the vehicle speed;
a multiphase adder (32) which subtracts the harmonic component from the sine wave to generate the modulation wave; and
a PWM inverter (20) which performs PWM control on the multiphase AC motor (7) using the modulation wave.

3. The electric power steering device (1) according to claim 2, wherein
the variable controller (33) is a switch (33) which
outputs a value acquired by setting the amplitude of the harmonic component to zero when the vehicle speed exceeds a predetermined value, and
directly outputs a value of the harmonic component when the vehicle speed is equal to the predetermined value or slower.

4. The electric power steering device (1) according to claim 3, wherein the harmonic component is a triangular wave which is a harmonic odd-number multiple of the fundamental.

5. The electric power steering device (1) according to claim 2, wherein the harmonic component includes a third-order integral-multiple harmonic relative to the fundamental.

6. The electric power steering device (1) according to claim 3, wherein the harmonic component includes a third-order integral-multiple harmonic relative to the fundamental.

7. The electric power steering device (1) according to claim 1, wherein the harmonic component is a triangular wave which is a harmonic odd-number multiple of the fundamental.

8. The electric power steering device (1) according to claim 1, wherein the harmonic component includes a third-order integral-multiple harmonic relative to the fundamental.

9. The electric power steering device (1) according to claim 2, wherein the harmonic component is a triangular wave which is a harmonic odd-number multiple of the fundamental.

* * * * *